(12) United States Patent
Chen

(10) Patent No.: US 7,474,031 B2
(45) Date of Patent: Jan. 6, 2009

(54) MIKE 4001 DESIGN OF THE STATOR OF ELECTRICAL MOTOR AND GENERATOR

(76) Inventor: Yue-Chung Chen, 31 Sharon Ct., Metuchen, NJ (US) 08840

(*) Notice: Subject to any disclaimer, the term of this patent is extended or adjusted under 35 U.S.C. 154(b) by 0 days.

(21) Appl. No.: 10/819,667

(22) Filed: Apr. 7, 2004

(65) Prior Publication Data
US 2005/0225193 A1   Oct. 13, 2005

(51) Int. Cl.
*H02K 1/00* (2006.01)
(52) U.S. Cl. ..................................... 310/216
(58) Field of Classification Search .............. 310/180, 310/192, 194, 208
See application file for complete search history.

(56) References Cited
U.S. PATENT DOCUMENTS

| | | | | |
|---|---|---|---|---|
| 1,537,737 A | * | 5/1925 | Bergman | ..................... 310/174 |
| 4,146,210 A | * | 3/1979 | Koval et al. | ................... 254/375 |
| 4,600,873 A | * | 7/1986 | Roesel et al. | ................ 318/701 |
| 4,763,093 A | * | 8/1988 | Cirkel et al. | ................... 336/58 |
| 5,295,194 A | * | 3/1994 | Christensen | ................ 381/190 |
| 5,675,196 A | * | 10/1997 | Huang et al. | .............. 310/67 R |
| 5,719,547 A | * | 2/1998 | Kaneko et al. | ............. 336/180 |
| 6,326,713 B1 | * | 12/2001 | Judson | ....................... 310/112 |
| 6,389,679 B1 | * | 5/2002 | Kliman et al. | ................ 29/596 |
| 6,674,213 B2 | * | 1/2004 | Berger | ......................... 310/261 |
| 6,965,183 B2 | * | 11/2005 | Dooley | ........................ 310/201 |

* cited by examiner

*Primary Examiner*—Nguyen N Hanh
(74) *Attorney, Agent, or Firm*—Fulwider Patton LLP

(57) ABSTRACT

When we use a new structure of stator of a motor (or generator) to let magnetic flux travel less distance in air and keep the flux pattern the same as before then we can improve its efficiency. Motor structure didn't change too much in decades. If we can greatly improve its efficiency and along with battery capacity, lessen their weight, then an electrical car may be as practical as a gasoline car. The electrical airplane may also become practical. The power plant may generate more electricity with same energy consumed.

18 Claims, 8 Drawing Sheets

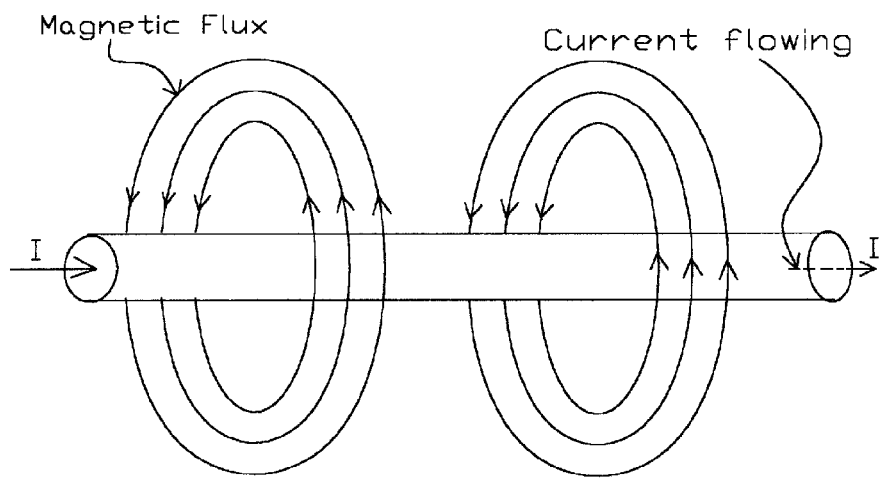
FIG. 1
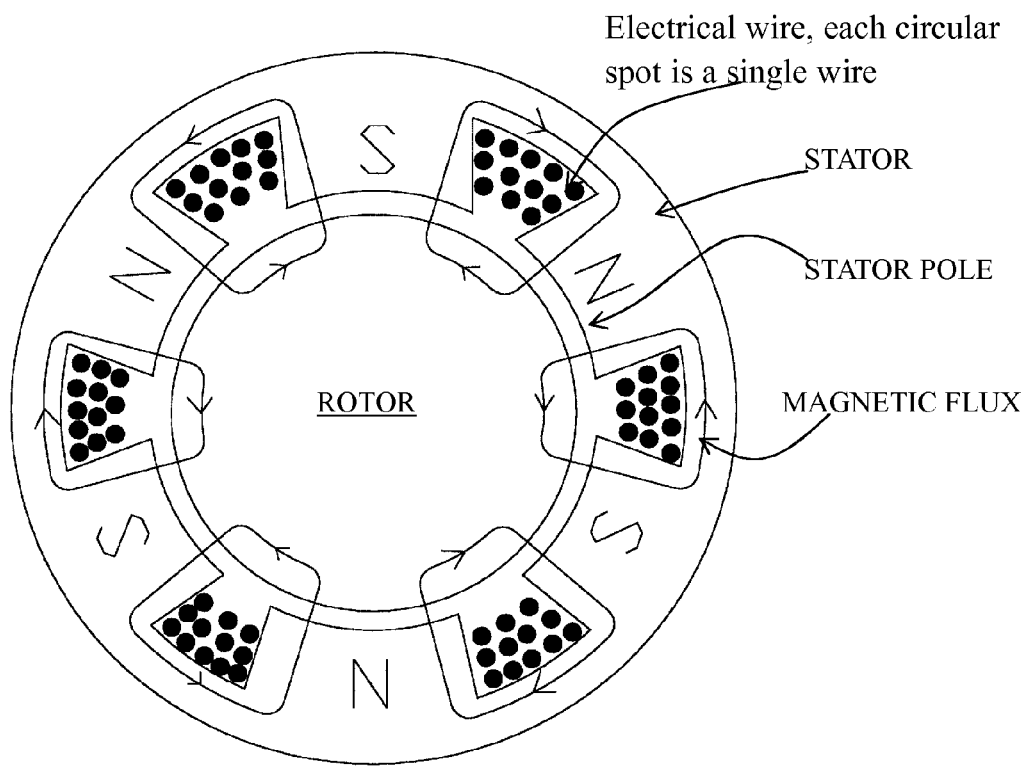
FIG. 2 CROSS SECTION VIEW OF TRADITIONAL MOTOR

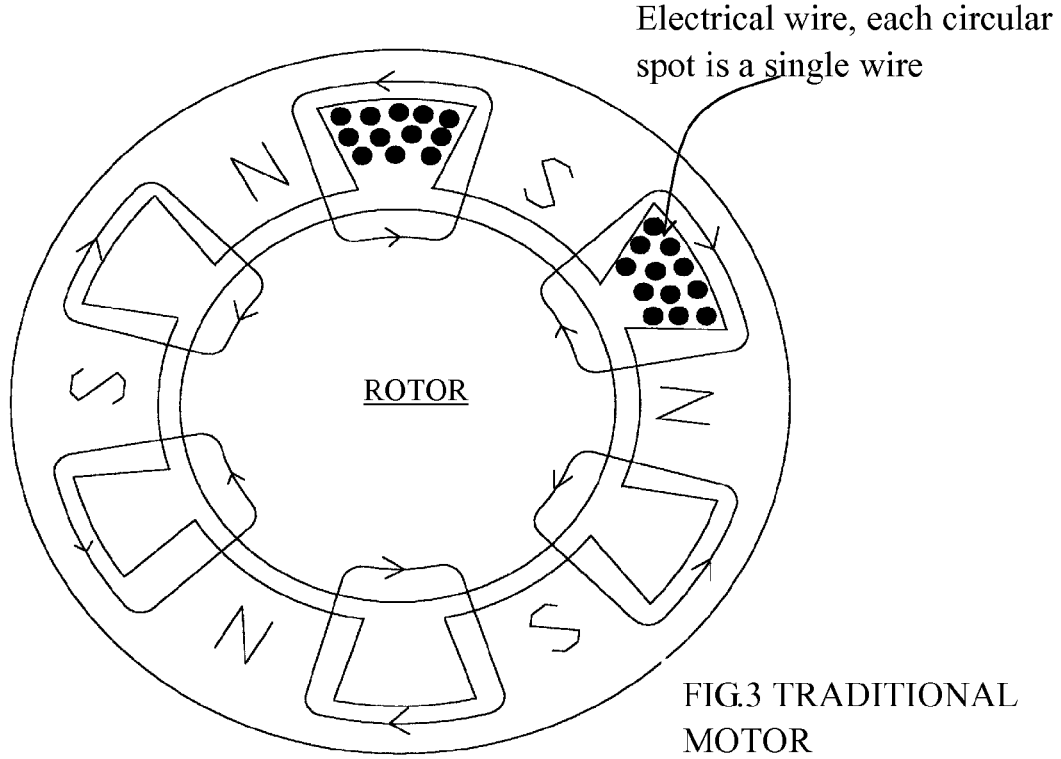
FIG.3 TRADITIONAL MOTOR
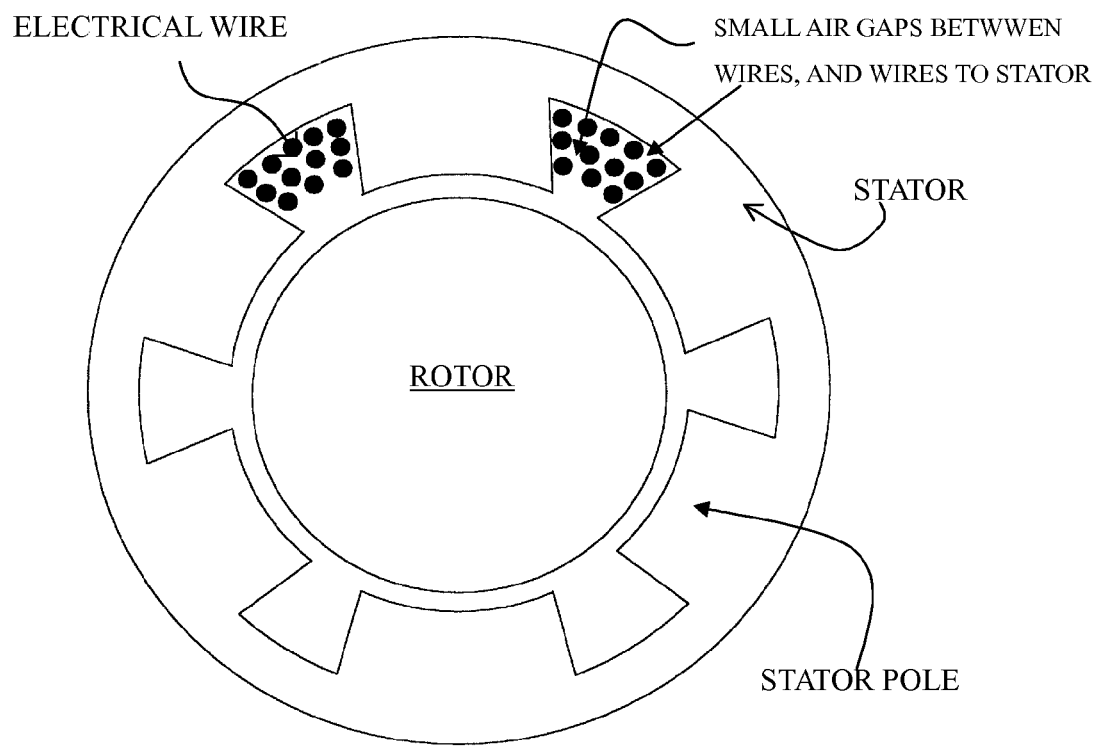
FIG.4 TRADITIONAL MOTOR STATOR

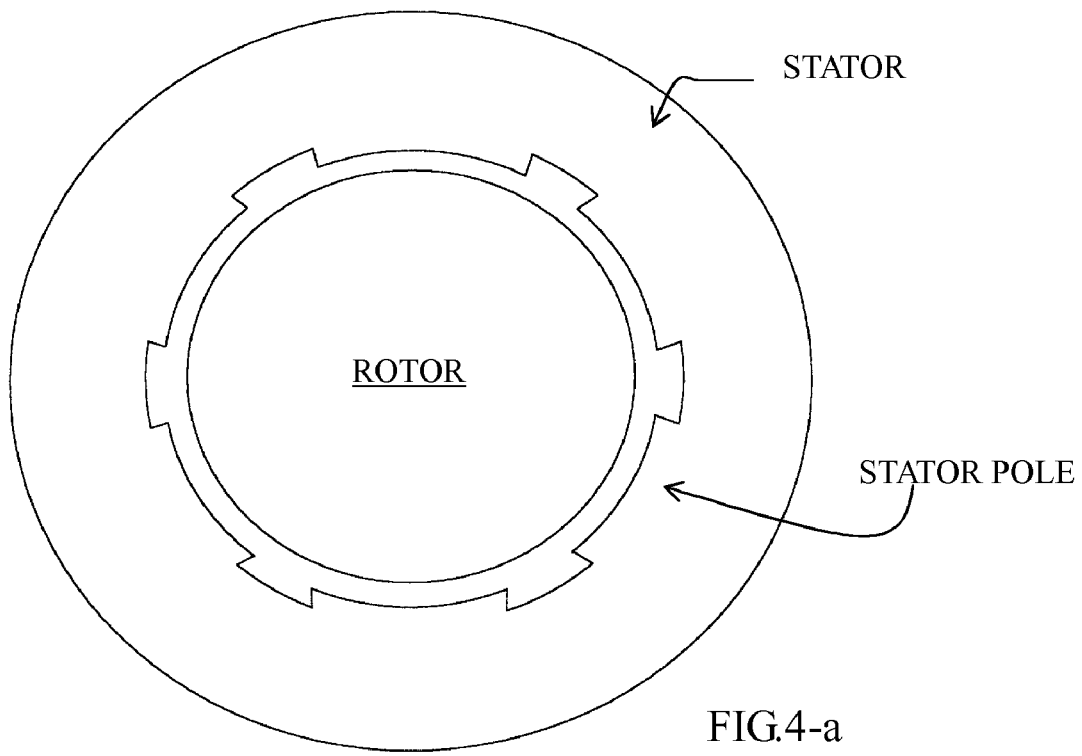
FIG.4-a
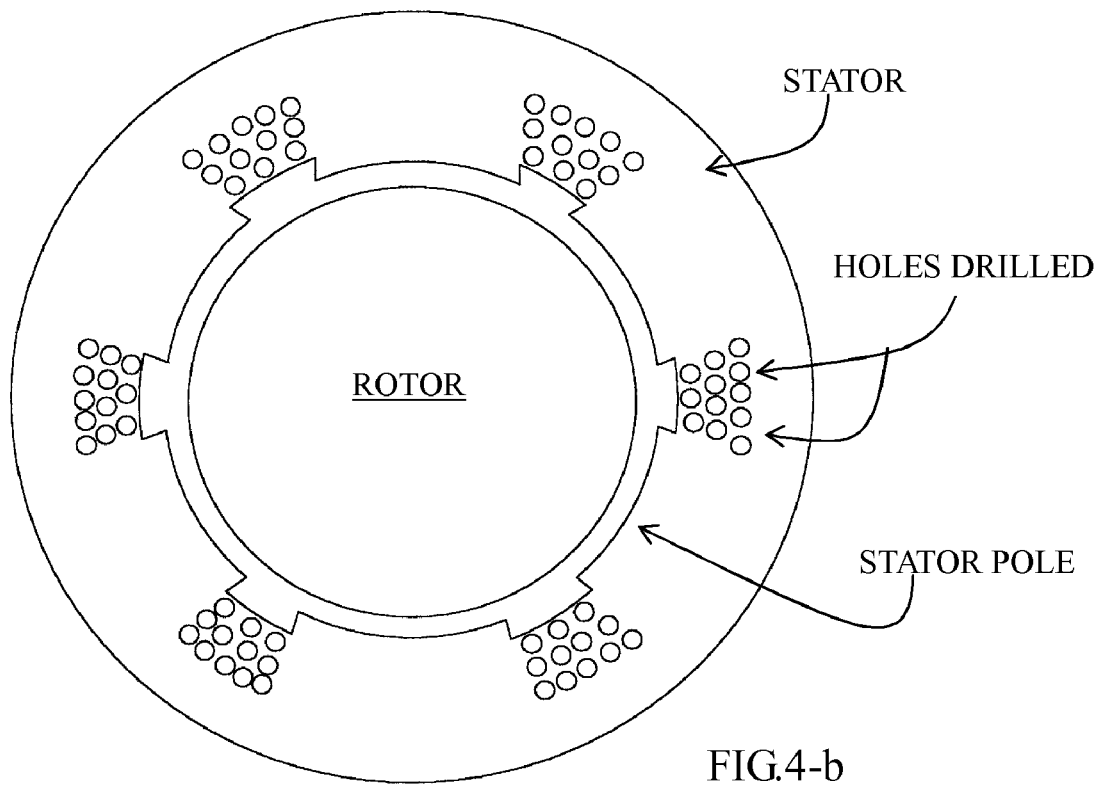
FIG.4-b

FIG.4-c

FIG.4-2 Traditional Stator Salient Pole Winding

FIG.5    Traditional transformer

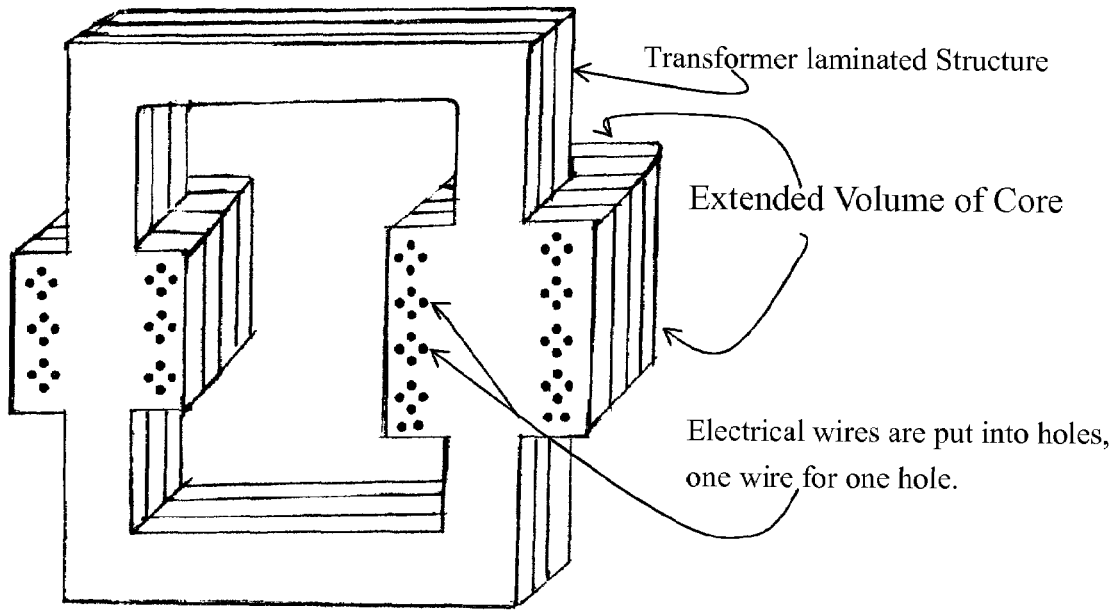
FIG.5-1-1 Cross Section View of FIG.5-1
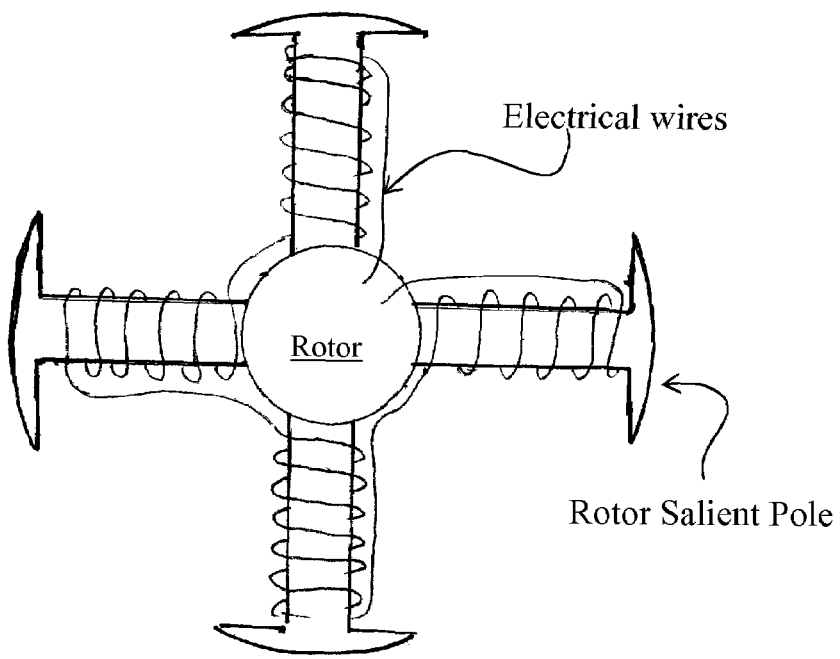
FIG.6 Traditional Rotor with Salient Pole winding

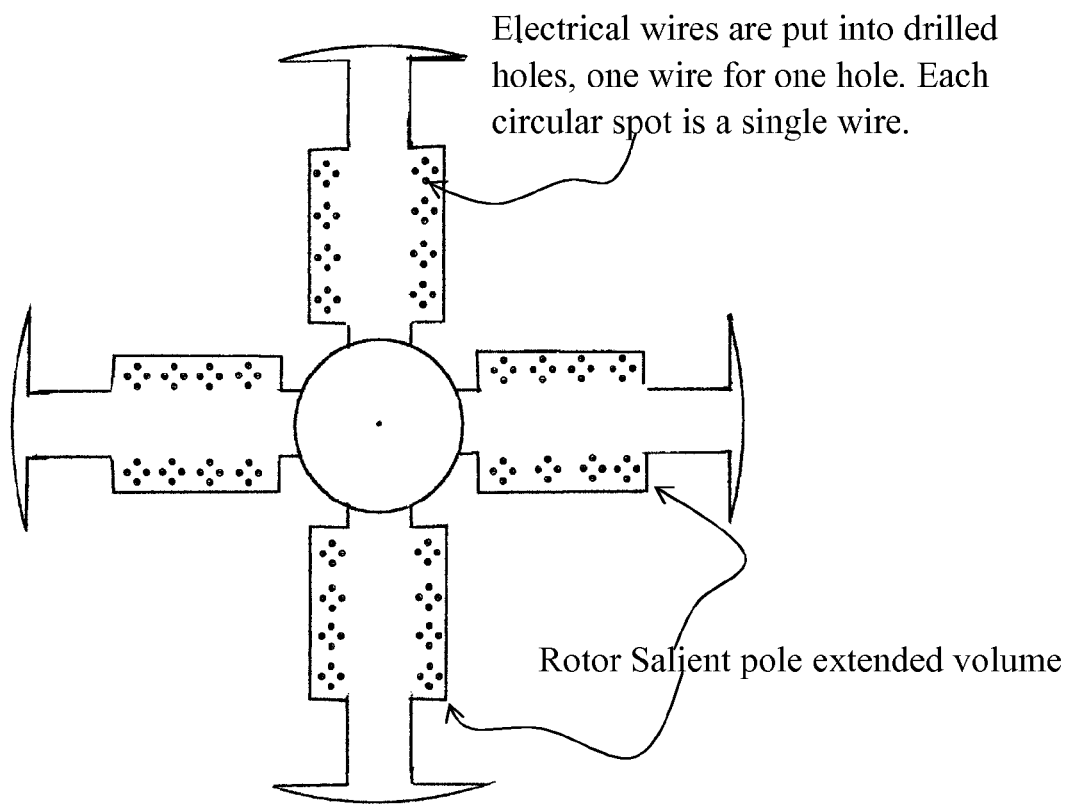
FIG.6-1  Cross section view of Rotor with electrical winding in extended volume

MIKE 4001 DESIGN OF THE STATOR OF ELECTRICAL MOTOR AND GENERATOR

BACKGROUND OF INVENTION

Textbook definition of "magnetic saturation condition": the maximum magnetic flux in a material, it cannot be increased significantly even with a higher magnetomotive force applied.

Textbook definition of "soft magnetic material": the soft magnetic materials show magnetic properties only when they are subject to a magnetizing force.

In order to increase the efficiency of an electrical motor, we need to maintain the same strength of the magnetic filed (close to but below the magnetic saturation condition) in the motor stator with less current flowing in the stator electrical winding than it originally was. In general, people use electrical wire with current flowing through it to generate magnetic field (as FIG. 1) and let magnetic flux flow through motor stator poles and motor rotor assembly (as FIG. 2) to create electromagnetic force to turn the rotor. But any soft magnetic material get its own magnetic saturation condition, so if we can maintain the same magnetic flux condition in stator as it was with less current flowing through the electrical winding, then we increase the efficiency of the electrical motor. And another thing we need take into consideration is that for any electric-magnetic device (motor, generator, transformer etc.), the magnetic flux pattern should not be changed after we do something to improve its efficiency so it will function just as before. Then a new stator structure (for motor generator) will be developed to achieve the result we want. Also this idea can be used in electrical generator, transformer and the rotor part (if it has electrical winding with it) of electrical motor (or generator).

The reluctance of a material is equal to (L/uA), where L is the length of the material, A is its cross section area, and u is the permeability. The permeability of ferromagnetic can be hundreds or thousands times bigger than the permeability of air. The reluctance may be hundreds or thousands times bigger in air than in ferromagnetic.

So if we can make magnetic flux pass less distance in the air, we can improve the efficiency of magnetic flux generation.

Now, for example of an induction motor (the most used motor-without electrical winding in the rotor assembly), magnetic flux generated by the electrical wire must pass through the small air gaps to reach the stator (as FIG. 4). In a bunch of wires of electrical winding, the small air gaps are between wires to wires and wires to the stator of electrical motor. This will cause energy loss in creating magnetic flux in stator and make electrical motor less efficiency.

If we can eliminate those numerous small air gaps between wires to wires and wires to stator, then we can use much less electricity to create same strength magnetic field. And at the all time, the magnetic flux pattern in the stator cannot be changed so the motor (or generator) will function just as before. If we can make all these happen in a motor (or generator). The global electricity shortage will no longer be a problem.

The reason we cannot create a super strong magnetic flux in stator is the magnetic saturation condition but we can use much less current to create same strength magnetic field as it was with the new design structure of stator.

BRIEF SUMMARY OF THE INVENTION

The way I develop to make motor more efficient is to design a different motor stator structure to keep the magnetic flux pattern the same as before and to let electrical wire get as close contact as possible to the part of the stator structure where we want the magnetic flux be generated. Because the magnetic flux pattern is the same as before so the motor will function just as before. The new shape of stator structure which gets extended volume to cover the space where electrical winding originally is. The extended stator part gets holes through to accommodate the electrical windings, so the position and formation of electrical windings will stay unchanged then the magnetic flux pattern in the stator will not be changed. The motor (or generator) will function as before but with its efficiency improved.

BRIEF DESCRIPTION OF THE SEVERAL VIEWS OF THE DRAWINGS

FIG. 2 illustrates the cross section view of a traditional induction motor;

FIG. 4-a illustrates the first step to build a stator having an extended volume structure;

FIG. 4-b illustrates the second step to build a stator having an extended volume structure;

FIG. 4-c illustrates the third step to build a stator having an extended volume structure;

FIGS. 4-1 illustrates a stator having an extended volume structure with its magnetic fields as the same as those in traditional stator;

FIGS. 4-2 illustrates a traditional stator salient pole winding;

FIGS. 4-3 illustrates a second embodiment of the stator with different winding layout compared to the stator illustrated in FIGS. 4-1;

FIGS. 5-1 illustrates a transformer having an extended volume structure;

FIGS. 5-1-1 is the cross section view of FIGS. 5-1;

FIG. 6 illustrates the traditional rotor with electrical winding;

FIGS. 6-1 illustrates a rotor with electrical winding (cross section view) having an extended volume structure;

DETAILED DESCRIPTION OF EMBODIMENTS OF THE INVENTION

Figure 4:
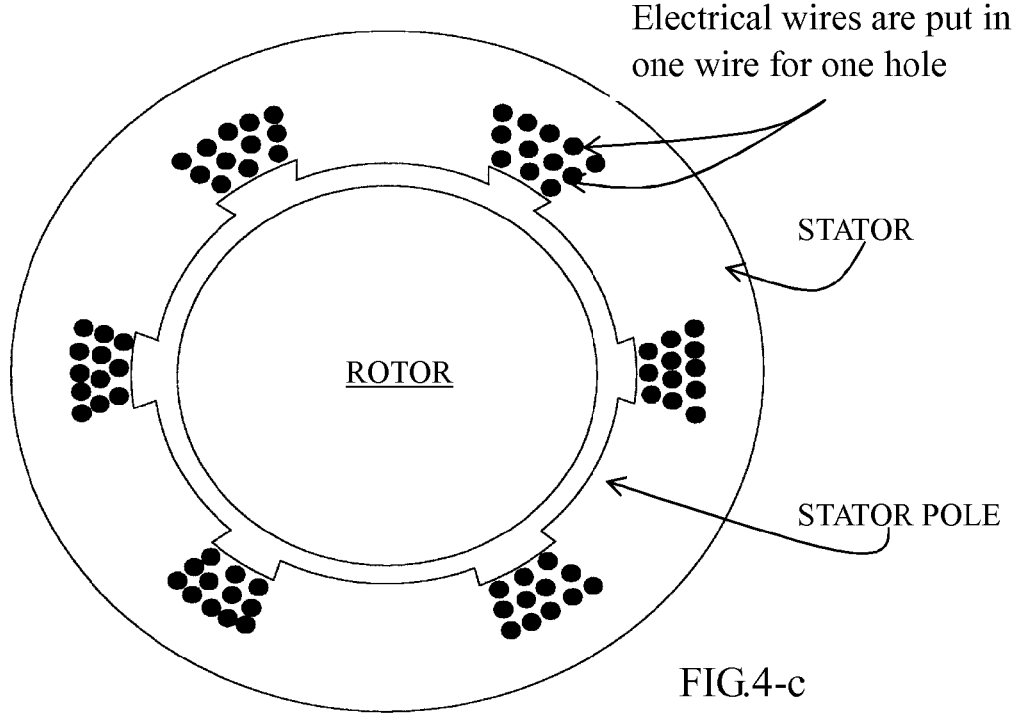
FIG. 4 illustrates the small air gaps between wires to wires and wires to stator.

How to build the structure having an extended volume (for example, a stator):

First: we can build a stator (like FIG. 4-a);

Second: we drill holes in the position where the electrical wires used to be (FIG. 4-b).

Third: we insert insulated painted electrical wire into those holes (FIG. 4-c).

The magnetic flux (FIGS. 4-1) will flow like those in the traditional motor (FIG. 2) but both stator structures are not the same. The new design consumes much less current due to much less air gap the magnetic fluxes need to overcome to reach the stator structure.

Figure 1:
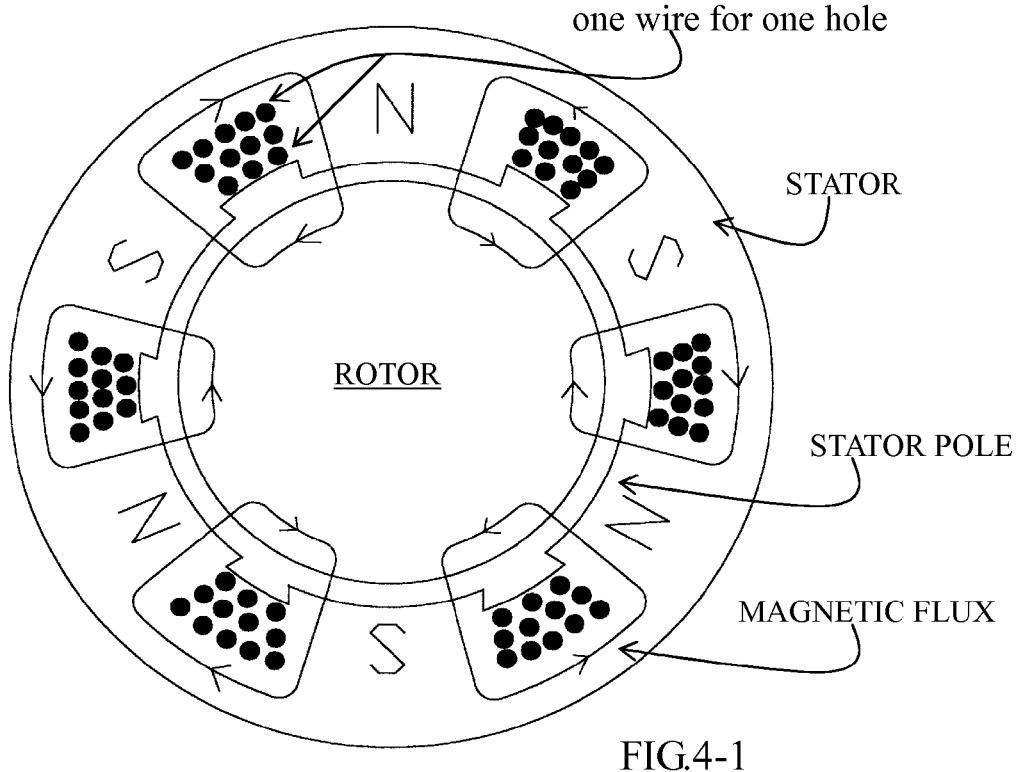
FIG. 1 illustrates the magnetic field created from electrical current.
Figure 4:
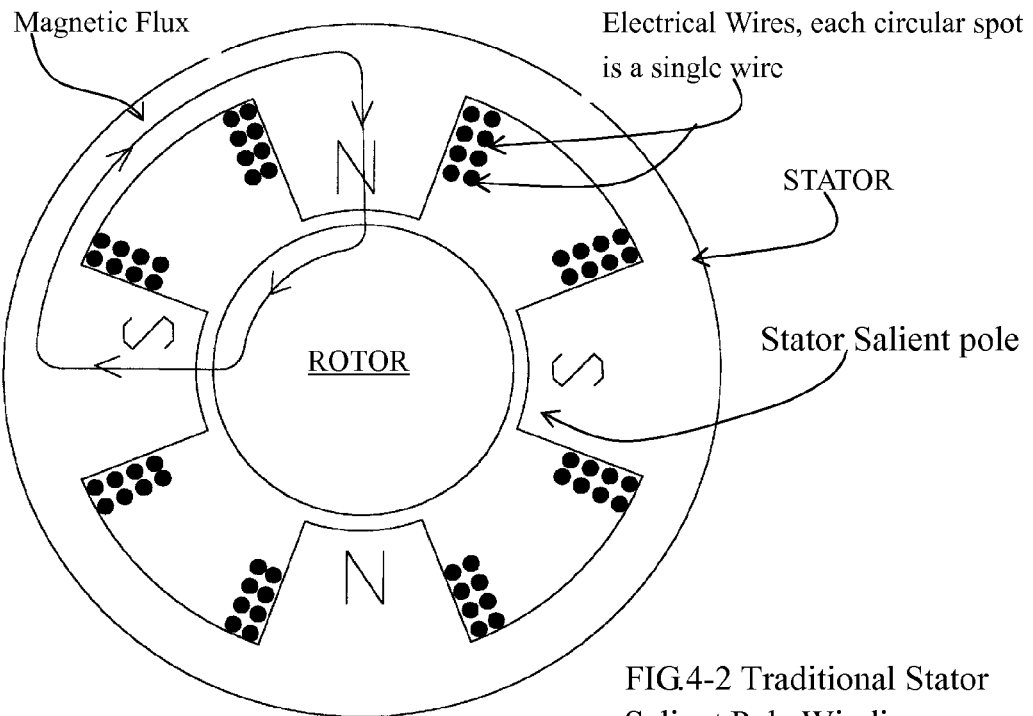
Figure 3:
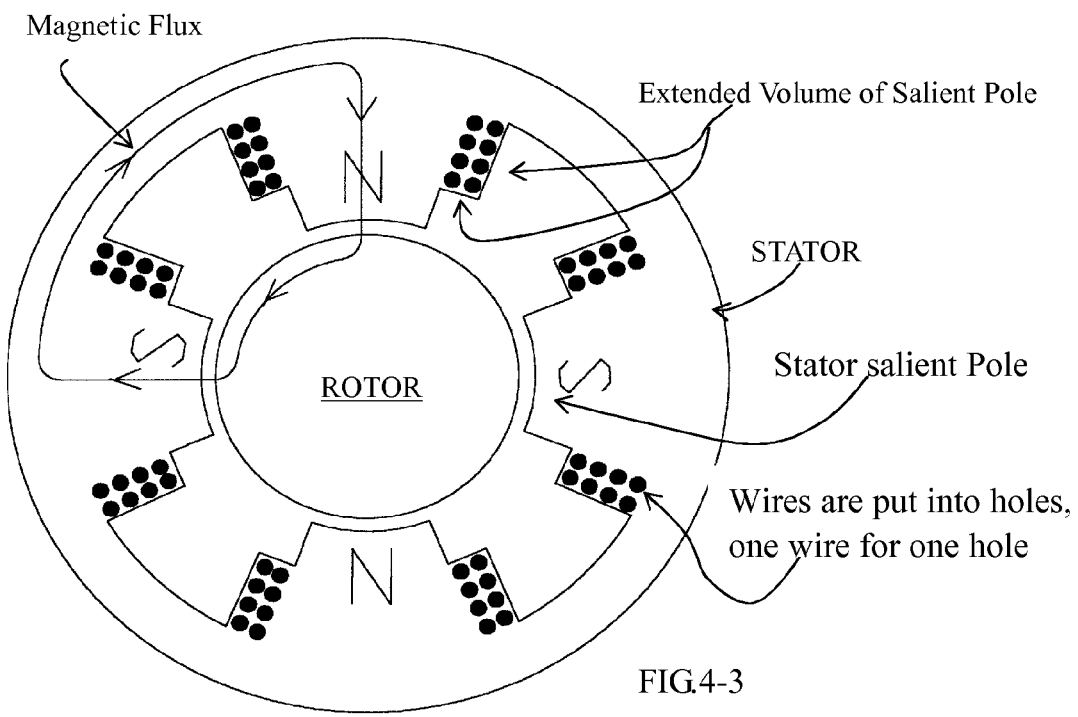
FIG. 3 illustrates the electrical wires position in the traditional motor & generator.

The new design of stator will look like FIGS. 4-1. With different electrical winding, it may look like the design illustrated in FIGS. 4-3. For example, FIGS. 4-1 illustrates a design for stator distributed poles, and FIGS. 4-3 illustrates a design for stator salient poles. The whole stator is in different shape from a traditional one and the material is soft magnetic material just as the traditional one. It is also a laminated structure to reduce eddy current. Electrical wires are insulated painted and inserted into holes, which are drilled through the stator in the place where those electrical wires originally are (see FIGS. 4-1, and 4-3), and the size (diameter) of wire makes close contact with the stator wall in its hole. This design can also be used in electrical generator and transformer to increase their efficiency. This design also can be used in anywhere to use much less electrical current to generate same strength magnetic flux as it was (magnetic saturation condition is considered here).

The magnetic flux (FIGS. 4-1) will flow like those in the traditional motor (FIG. 2) but both stator structures are not the same. The new design stator gets extended volume to cover the space where the electrical winding originally is. The new design consumes much less current due to much less air gap the magnetic fluxes need to overcome to reach the stator structure.

Figure 5:
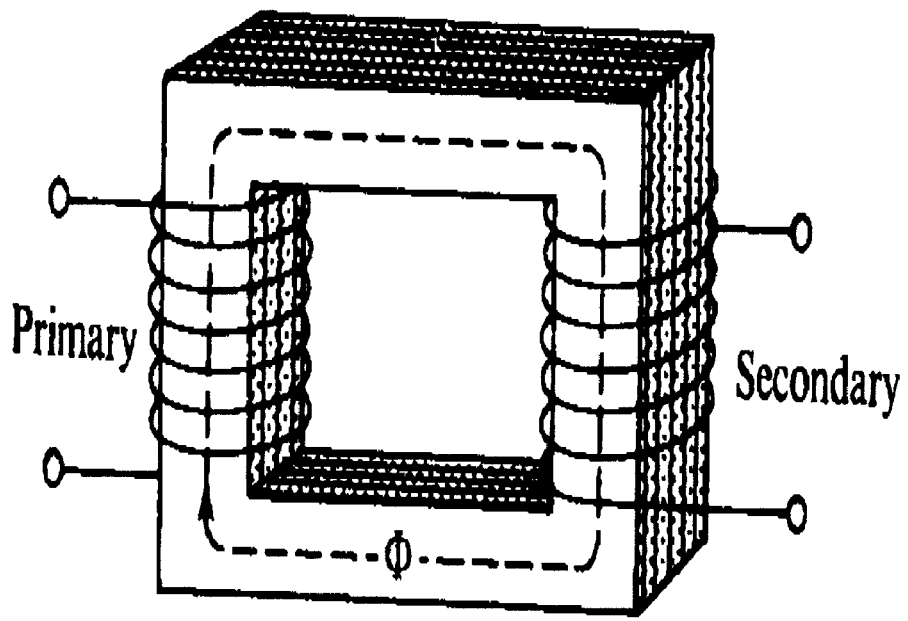
FIG. 5 illustrates a traditional transformer.
Figure 1:
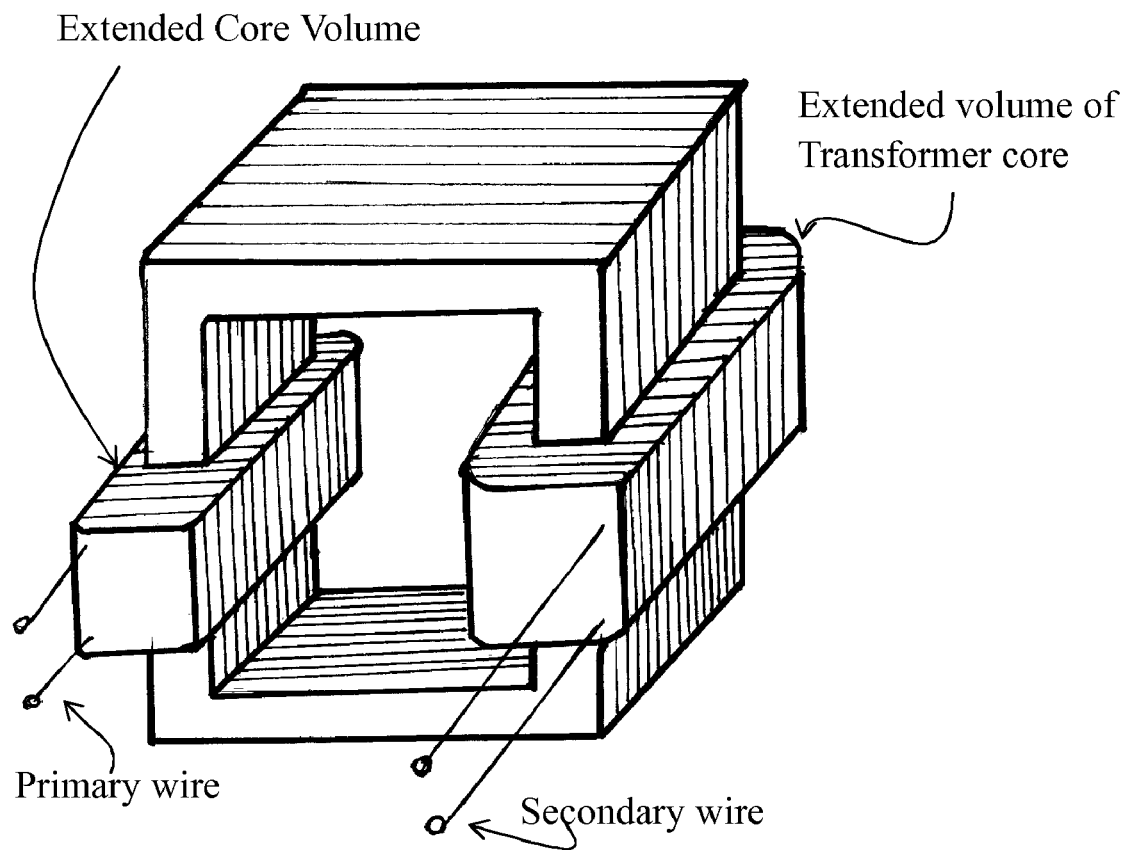

Same procedure to build the extended volume structures for the transformer, rotor, as illustrated in FIGS. 5-1 and 6-1 respectively.

More Consideration of the Material of the Stator:

If a non-electricity conductivity soft magnetic material (it must be soft magnetic material too) can be found and used (physically strong enough) to build the new design structure (as illustrated in FIGS. 4-1, 4-3, 5-1, and 6-1), the electrical winding wire can be build from hot liquid form poured into the hole then it will become the solid bare wire after it gets cold, this will create closest contact between wall of stator (or rotor, transformer core) holes and wires. They are welded together. Magnetic flux generation in structure will be even more efficient. In this way, we must prevent the hot liquid wire metal building up between the laminated stator pieces and cause unexpected result. Another way is we can squeeze a soft metal like bare copper wire into the hole of the stator built with the new material to get a close contact with the stator. There may already some more advanced ways to make a close contact like what we want but that is not the issue here. With the non-current conductivity character, we do not need insulated painted wire but just use bare wire to do the job.

This design is especially for motor (generator, transformer) using heavy wires (for ¼ hp (horse power) or bigger motor) not for very thin wires or it may be hard to build with the technology we have now.

While several particular forms of the invention have been illustrated and described, it will also be apparent that various modifications may be made without departing from the scope of the invention. It is also contemplated that various combinations or subcombinations of the specific features and aspects of the disclosed embodiments may be combined with or substituted for one another in accordance with the invention. It is to be understood that the detailed description and the accompanying drawings as set forth hereinabove are not intended to be exhaustive or to limit the breadth of the present invention. Accordingly, it is not intended that the invention be limited, except as by the claims.

The invention claimed is:

1. A rotating machine, comprising:
a stator having a plurality of stator pole faces, an extended volume between the stator pole faces, and a plurality of holes located in the extended volume and outside of the stator pole faces, wherein each hole includes only one wire placed therethrough to form windings for the stator, the extended volume is composed of a soft magnetic material, and the magnetic flux travels through the magnetic material of the extended volume of the stator rather than through air to increase the efficiency of the generation of magnetic flux;
a rotor capable of revolving within the stator.

2. The rotating machine of claim 1, wherein the stator has stator distributed poles.

3. The rotating machine of claim 1, wherein the stator has stator salient poles.

4. The rotating machine of claim 1, wherein the wire is insulated, and the insulated wire placed through each hole is in contact with the wall of the hole, such that only one insulated wire is placed through each hole.

5. The rotating machine of claim 1, wherein the wire placed through each hole is formed by pouring molten metal into the hole.

6. A rotating machine, comprising:
a stator; and
a rotor having salient rotor poles capable of revolving within the stator, each salient rotor pole having an extended volume extending from the side of the rotor pole, and a plurality of holes formed in the extended volume, wherein each hole includes only one wire placed therethrough to form rotor salient pole windings.

7. The rotating machine of claim 6, wherein the stator has a plurality of stator pole faces, an extended volume between the stator pole faces, and a plurality of holes located in the extended volume and outside of the stator pole faces, wherein each hole includes a stator winding wire placed therethrough.

8. The rotating machine of claim 6, wherein the wire placed through each hole is insulated, and the insulated wire placed through each hole is in contact with the wall of the hole, such that only one insulated wire is placed through each hole.

9. The rotating machine of claim 6, wherein the wire placed through each hole is formed by pouring molten metal into the hole.

10. The rotating machine of claim 6, wherein the extended volume is composed of a soft magnetic material, and the magnetic flux travels through the magnetic material of the extended volume of the rotor rather than through air to increase the efficiency of the generation of magnetic flux.

11. A transformer, comprising:
a magnetic core having an extended volume extending from the side of the core, and a plurality of holes formed in the extended volume, wherein each hole includes only one wire placed therethrough to form windings for the transformer, and the extended volume includes at least one hole for each turn of the windings.

12. The transformer of claim 11, wherein the wire placed through each hole is insulated, wherein the insulated wire placed through each hole is in contact with the wall of the hole, such that only one insulated wire is placed through each hole.

13. The transformer of claim 12, wherein the insulated wire placed through each hole is not bifilar wound.

14. The transformer of claim 11, wherein the wire placed through each hole forms primary and secondary windings for the transformer, and the extended volume includes at least one hole for each turn of the primary and secondary windings.

15. A rotating machine, comprising:
a stator having stator poles, each stator pole having an extended volume extending from the side of the stator pole, and a plurality of holes located in the extended volume, wherein each hole includes only one wire placed therethrough to form windings for the stator, the extended volume is composed of a soft magnetic material, and the magnetic flux travels through the magnetic material of the extended volume of the stator pole rather than through air to increase the efficiency of the generation of magnetic flux;
a rotor capable of revolving within the stator.

16. The rotating machine of claim 15, wherein the stator has stator distributed poles.

17. The rotating machine of claim 15, wherein the stator has stator salient poles.

18. The rotating machine of claim 15, wherein the wire is insulated, and the insulated wire placed through each hole is in contact with the wall of the hole, such that only one insulated wire is placed through each hole.

* * * * *